J. C. Pennington,
Oscillating Steam Engine.

Nº 18,211. Patented Sep. 16, 1857.

UNITED STATES PATENT OFFICE.

JOHN C. PENNINGTON, OF PATERSON, NEW JERSEY.

VALVE-GEAR FOR OSCILLATING STEAM-ENGINES.

Specification of Letters Patent No. 18,211, dated September 15, 1857.

*To all whom it may concern:*

Be it known that I, JOHN C. PENNINGTON, of Paterson, Passaic county, and State of New Jersey, have invented a new and useful Valve and Expansion Gear for Oscillating Engines, and that the following specification, taken in connection with the drawings, is a full, clear, and exact description thereof.

Figure 4:
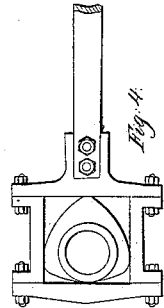
Figure 3:
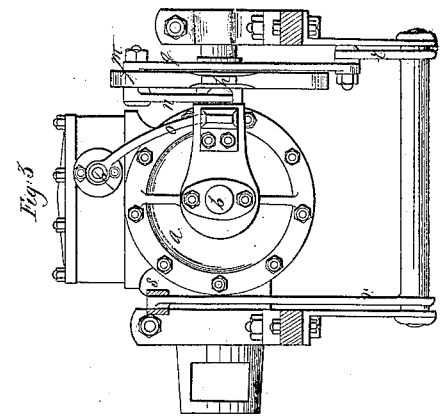
Figure 1:
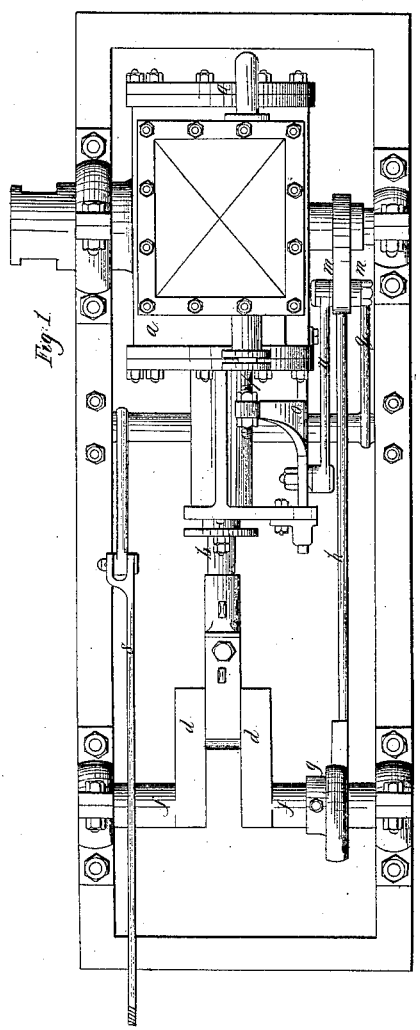
Figure 2:
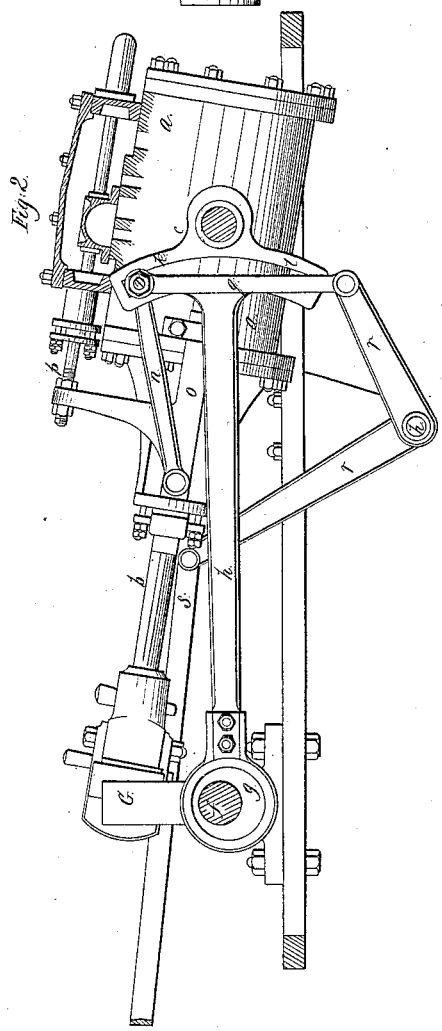

In the drawings Figure 1 is a plan of an oscillating engine complete, fitted with my expansion valve gear. Fig. 2 is an elevation of the same taken from one side with the valve and chest in section. Fig. 3 is a front elevation thereof and Fig. 4 is a side view of a cam and cam box that may be used in place of the eccentric and ring shown in the other drawings.

The nature of my invention consists in making a valve and expansion gear for an oscillating engine by means of an eccentric, so set on the shaft that its radius of greatest throw is in line with a radius passing through the center of the crank pin or nearly so and provided with a rod carrying a slotted arc or its equivalent which receives a pin connected by proper appliances with the valve, the whole acting together substantially as herein set forth.

In the drawings the cylinder of the engine is shown at *a a*, a piston rod at *b*, crank pin center at *c*, crank at *d* and shaft at *f*, the whole as well as the proper stuffing boxes pillow blocks, trunnions, and valve chest together with the framing being of ordinary construction.

Upon the shaft is keyed an ordinary eccentric *q* with its line of greatest throw in line with the centers of cranks and crank pin, as clearly shown in Fig. 2. This eccentric has a ring and rod *h*, and the rod is prolonged to, and beyond the trunnion which it embraces, (see dotted lines around trunnion in Fig. 2). This eccentric rod has also two arms in which is a continuous slot as at *k l*. As the engine moves this eccentric rod moves back and forth having a motion nearly coincident with the connecting rod of an ordinary engine. In the slot is fitted a pin *m* which by means of a link *n* is connected to a slide *o*, attached to a valve stem *p* and to the same pin is attached a radius bar *q*, connected to a bell crank *r r* one of whose arms is attached to a rod *s*, the object of this whole latter arrangement being to move the pin to any required position in the slotted arc and hold it there during the motion of the engine.

The valve stem is attached to any usual form of slide provided with a sufficient lap, and the point of cut off may be varied within certain limits by altering the position of the pin within the slot. The engine moreover may be reversed and will run reversed cutting off at any desired point within certain limits by moving the pin past a line drawn from the center of the trunnion to the center of the shaft.

I intend sometimes to construct my valve gear with a slotted arm on one side of the trunnion only in which case the point of cut off may be varied but the engine will not run reversed.

Inspection of the drawings will show that the eccentric is set nearly at right angles to the ordinary position of eccentrics and that the curve in the slotted arc is reversed or is concave in the opposite direction from the slotted arcs generally used in oscillating engines, its purpose being to move the valve by the swing of the cylinder; instead of compensating for that swing and leaving the valve gear to act as in a stationary cylinder engine. The valve in this engine is moved by the joint action of the eccentric and the cylinder, the swing of the latter being the chief agent.

What I claim as of my own invention and desire to secure by Letters Patent is—

A valve gear for an oscillating engine composed of an eccentric set substantially as described and a slotted arc the curve in which is concave toward the shaft and provided with a sliding pin which is connected with the valve or the equivalents thereof, and this I claim whether the slot be long enough for reversal or of such length as may be sufficient for running the engine in one direction only.

In testimony whereof I have hereunto subscribed my name on this 21st day of August A. D. 1857.

JOHN C. PENNINGTON.

In presence of—
 A. S. PERNINGTON,
 PERIGRINE SANDFORD.